United States Patent [19]
Fry

[11] Patent Number: 5,237,892
[45] Date of Patent: Aug. 24, 1993

[54] REDUCED MATERIAL CRANKSHAFT FABRICATION

[75] Inventor: Emanuel D. Fry, Tecumseh, Mich.

[73] Assignee: Tecumseh Products Company, Tecumseh, Mich.

[21] Appl. No.: 920,822

[22] Filed: Jul. 28, 1992

[51] Int. Cl.[5] .............................................. F16C 3/04
[52] U.S. Cl. ..................................... 74/603; 74/595; 74/597; 74/598; 29/888.08
[58] Field of Search ................. 74/595, 596, 597, 598, 74/603, 604; 29/6, 888.08; 123/197.4, 192.2

[56] References Cited

U.S. PATENT DOCUMENTS

| | | | |
|---|---|---|---|
| 2,364,109 | 12/1944 | Taylor | 29/6 |
| 3,045,507 | 7/1962 | Turlay | 74/603 |
| 3,538,788 | 11/1970 | Patchen | 74/603 |
| 3,599,509 | 8/1971 | Romer | 74/598 |
| 3,772,763 | 11/1973 | Henson | 29/470.3 |
| 3,777,340 | 12/1973 | Langlois | 74/603 |
| 4,342,236 | 8/1982 | Everts | 74/603 |
| 4,493,226 | 1/1985 | Andrione | 74/598 |
| 4,641,546 | 2/1987 | Mettler | 74/598 |
| 4,881,427 | 11/1989 | Yasutake | 74/603 |
| 4,936,268 | 6/1990 | Randle | 123/197.4 |
| 5,000,141 | 3/1991 | Sugano | 74/603 |
| 5,014,572 | 5/1991 | Swars | 29/888.08 |
| 5,022,835 | 6/1991 | Da Costa | 74/595 X |
| 5,038,847 | 8/1991 | Donahue et al. | 74/595 X |
| 5,163,341 | 11/1992 | Murrish et al. | 74/595 |

FOREIGN PATENT DOCUMENTS

| | | | |
|---|---|---|---|
| 448030 | 4/1948 | Canada | 74/603 |
| 58-77950 | 5/1983 | Japan | 74/603 |

Primary Examiner—Vinh T. Luong
Attorney, Agent, or Firm—Baker & Daniels

[57] ABSTRACT

A crankshaft having a high stress portion including a crankpin and an eccentric. The high stress portion is formed of a forged steel material having a first axial end. A reduced stress portion is formed from an unforged steel material and generally comprises a tubular cylindrical portion having a second axial end. The first axial end is secured to the second axial end by friction welding. A separate counterweight is attached to either the high stress portion or the reduced stress portion.

6 Claims, 1 Drawing Sheet

REDUCED MATERIAL CRANKSHAFT FABRICATION

BACKGROUND OF THE INVENTION

The present invention generally relates to crankshafts for small reciprocating machines, such as engines and compressors and, more particularly, to such a crankshaft fabricated from more than one material.

Crankshafts have conventionally been cast or forged in a single piece. However, the complex shape of many crankshafts makes such manufacture relatively costly. Therefore, it has been found that production costs can be reduced by separately manufacturing the elements or segments forming the crankshaft and then assembling the segments together. For example, it is known to manufacture a crankcase by forging two separate segments and joining them together by a welding technique such as friction welding. In addition, it has been found that costs can be further reduced by manufacturing the individual crankshaft elements from different materials. For example, in one prior art crankshaft, the element comprising the eccentric and crankpin is formed of sintered metal, and the elongate tubular part of the crankshaft is formed of low-cost soft steel such as "Fe 35". The two elements are then joined together by projection welding to form the crankshaft. The use of less costly material for the segments of the crankshaft that are subject to reduced stresses decreases the overall cost of production.

It is desired to provide a crankshaft that lends itself to extremely economical manufacture.

SUMMARY OF THE INVENTION

The present invention provides a crankshaft including a high stress portion formed of a forged steel material and a reduced stress portion formed of an unforged steel material wherein the high stress portion and the reduced stress portion are connected to one another and a separate counterweight is attached thereto.

An advantage of the crankshaft of the present invention is that the high stress portion is formed of a forged steel material so that the crankpin and eccentric may be used in high stress applications.

Another advantage of the crankshaft of the present invention is the ability to centerless grind the critical bearing surfaces and hold them round. This advantage is due to the lack of a counterweight to throw the crankshaft out of balance during the grinding operation.

Another advantage of the crankshaft of the present invention is that the forged steel material is stronger than sintered metal, which is presently used for forming crankshafts made of different materials.

Yet another advantage of the crankshaft of the present invention is that the counterweight is separate piece that is connectable to the high stress portion of the crankshaft and may be made of a less costly material.

Still another advantage of the crankshaft of the present invention is that the portion of the crankshaft not subjected to high stresses can be made of a less costly material.

The present invention, in one form thereof, provides a crankshaft including a high stress portion and a reduced stress portion. The high stress portion includes a crankpin and an eccentric and is formed of a forged steel material having a first axial end. The reduced stress portion includes a tubular cylindrical portion formed from an unforged steel material and includes a second axial end. The first axial end is connected to the second axial end and a separate counterweight is attached to one of the crankshaft portions.

The present invention, in one form thereof, provides a method for making a crankshaft in which a blank steel material is forged to the shape of the high stress portion of the crankshaft, which includes the eccentric and the crankpin. A reduced stress portion is made from an unforged steel material and is shaped to form the generally tubular cylindrical portion of the crankshaft. The high stress portion includes a first axial end, which is securely joined to a second axial end of the reduced stress portion. A separate counterweight is attached to either the high stress portion or the reduced stress portion.

DESCRIPTION OF THE PREFERRED EMBODIMENT

Figure 1:
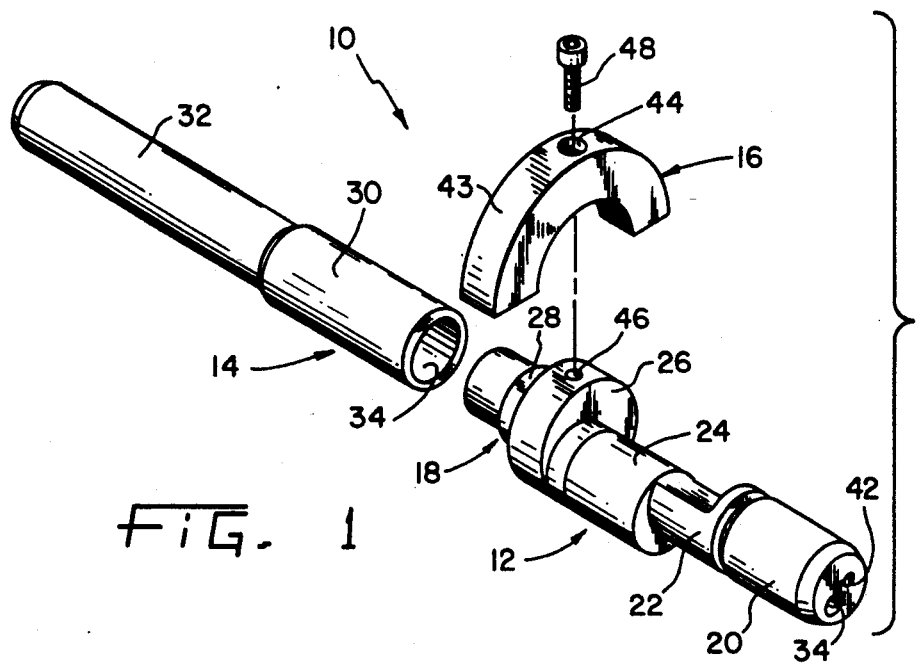
FIG. 1 is an exploded perspective view of a crankshaft according to the present invention.

Referring to FIG. 1, there is shown a crankshaft 10 for use in small reciprocating machines such as engines and hermetic compressors. Although this particular design of crankshaft 10 is designed for a particular compressor, other crankshaft designs embody the present invention as described. Crankshaft 10 generally comprises three portions: a high stress or forged portion 12, a reduced stress or unforged steel portion 14, and a counterweight 16. Forged portion 12 and mild steel portion 14 are attached to one another at connection 18.

Forged portion 12 generally includes an outboard bearing or crankpin 20, a reduced diameter portion 22, an eccentric 24, and an annular key portion 26 adapted to receive counterweight portion 16. Mild steel portion 14 includes an end shoulder portion 28 which is connected to key portion 26 at connection 18 and a generally cylindrical tubular portion including a middle cylindrical portion 30 and an end cylindrical portion 32 of reduced diameter.

Figure 2:
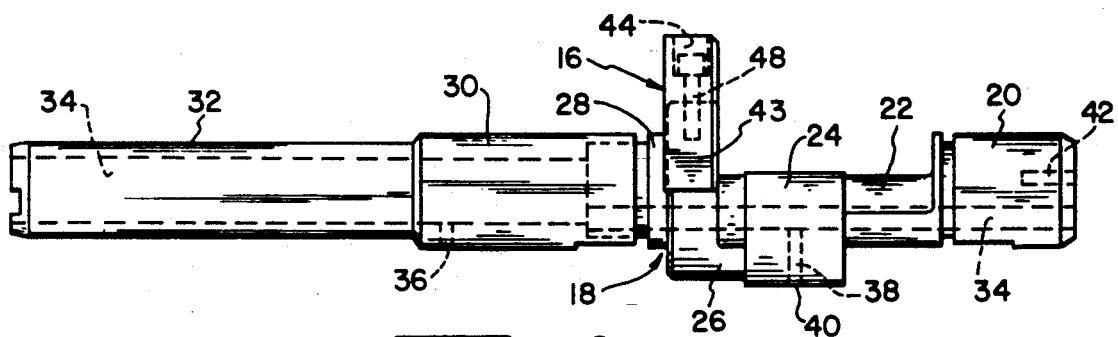
FIG. 2 is an assembled elevational view of the crankshaft of FIG. 1.
Figure 3:
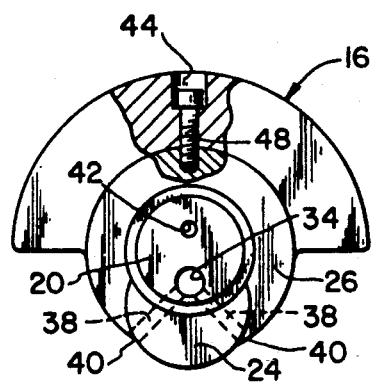
FIG. 3 is an end view of the crankshaft of FIG. 2.

Referring to FIGS. 2 and 3, crankshaft 10 is provided with a plurality of oil passageways for lubricating various parts of the compressor. A counterbore oil passage 34 extends the length of crankshaft 10. An optional radial oil passageway 36 communicates with passage 34 and may be provided to supply oil to a sleeve bearing (not shown). As shown in FIG. 3, a pair of radially extending oil ducts 38 extend from axial oil passage 34 to a pair of corresponding openings 40 on the outer cylindrical surface of eccentric portion 24. A small axially extending passage 42 is formed in outboard bearing 20 and is adapted to receive an off-center mounting bolt (not shown) which may be used to attach a counterweight (not shown) to the end of crankshaft 10.

Counterweight 16 generally comprises a semicircular hub portion 43 having a radially extending passage 44 extending therethrough which is aligned with opening 46 in key portion 26 to receive a threaded bolt 48 thereby securing counterweight 16 to forged portion 12. Other attachment means, such as welding, can also be used. Counterweight 16 may alternatively be secured to mild steel portion 14. Although counterweight 16 is preferably formed of cast iron or mild steel, it may be made of any other suitable material. The manufacture of counterweight 16 from a relatively low cost material is advantageous in reducing the manufacturing cost of the crankshaft.

Crankshaft 10 has less of a chance of being thrown out of balance when machined without counterweight 16. The separate counterweight 16 permits a higher quality ground surface on the critical bearing surfaces of crankshaft 10.

In the formation of forged portion 12, a blank of steel material, preferably C1117 AISI steel, is provided; however, other AISI steels may be utilized, such as C1118 and C1542 (modified), for example. The shape of the blank is cast, extruded or made from bar stock. Next, the shape of portion 12 is formed by forging the blank at a very high temperature, preferably between 1400° F. and 1700° F.

Mild steel portion 14, which forms the main bearing and rotor support member for a motor, may be made from a much less ductile material such as 1020 AISI cold rolled steel material. However, other unforged materials may be utilized. Since this portion of the crankshaft is subjected to much less stress than the eccentric and crankpin, a less expensive material may be utilized. Counterweight portion 16 is then bolted onto either mild steel portion 14 or forged portion 12. In a preferred embodiment, as shown in the drawings, counterweight portion 16 is bolted onto key portion 26 of forged portion 12. Forged portion 12 and mild steel portion 14 are then joined at 18 by welding or furnace brazing. The preferred form of attachment is by friction welding.

It will be appreciated that the foregoing is presented by way of illustration only, and not by way of any limitation, and that various alternatives and modifications may be made to the illustrated embodiment without departing from the spirit and scope of the invention.

What is claimed is:

1. A crankshaft comprising:
    a high stress portion including a crankpin and an eccentric, said high stress portion being formed of a forged steel material and having a first axial end;
    a reduced stress portion including a tubular cylindrical portion being formed of an unforged steel material and having a second axial end;
    connecting means for connecting said first axial end to said second axial end; and
    a separate counterweight attached to one of said high stress portion and said reduced stress portion.

2. The crankshaft according to claim 1, wherein said connecting means comprises a friction weld.

3. The crankshaft according to claim 1, wherein said unforged steel material is substantially similar to C1020 AISI cold rolled steel.

4. The crankshaft according to claim 1, wherein said mild steel material is C1020 AISI cold rolled steel.

5. The crankshaft according to claim 1, wherein said forged steel material is substantially similar to C1117 AISI steel.

6. The crankshaft according to claim 1, wherein said forged steel material is C1117 AISI steel.

* * * * *